United States Patent [19]

Shih

[11] Patent Number: 5,608,024
[45] Date of Patent: Mar. 4, 1997

[54] PROCESS FOR MAKING POLYMERS OF VINYL LACTAM AND A POLYMERIZABLE CARBOXYLIC ACID, OPTIONALLY WITH, A HYDROPHOBIC MONOMER, AS A STABLE COMPOSITION IN AN ALCOHOL-WATER SOLVENT SYSTEM, HAVING A RESIDUAL VINYL LACTAM CONTENT OF LESS THAN 500 PPM

[75] Inventor: Jenn S. Shih, Paramus, N.J.

[73] Assignee: ISP Investments Inc., Wilmington, Del.

[21] Appl. No.: 503,564

[22] Filed: Jul. 18, 1995

[51] Int. Cl.$^6$ .................................................. C08F 26/08
[52] U.S. Cl. .......................... 526/264; 524/379; 524/389; 524/548; 524/808; 524/850; 525/326.9
[58] Field of Search ........................ 524/765, 548, 524/850, 808, 389, 379; 525/326.9; 526/264

[56] References Cited

U.S. PATENT DOCUMENTS

| | | |
|---|---|---|
| 3,405,084 | 10/1968 | Bohac et al. .............................. 524/548 |
| 3,743,715 | 7/1973 | Viout et al. ........................... 524/548 X |
| 3,817,950 | 6/1974 | Viout et al. ....................... 525/326.9 X |
| 4,554,312 | 11/1985 | Barabas et al. ...................... 524/765 X |
| 4,767,613 | 8/1988 | Nuber et al. ...................... 525/326.9 X |
| 4,785,065 | 11/1988 | Uhl et al. ............................. 524/548 X |
| 5,021,526 | 6/1991 | Ball ..................................... 526/264 X |
| 5,045,617 | 9/1991 | Shih et al. ........................... 524/548 X |
| 5,122,582 | 6/1992 | Potthoff-Karl et al. ............. 526/264 X |
| 5,219,906 | 6/1993 | Shih et al. ........................... 524/548 X |
| 5,373,074 | 12/1994 | Wu et al. ............................. 526/264 X |

*Primary Examiner*—Judy M. Reddick
*Attorney, Agent, or Firm*—Walter Katz; Marilyn J. Maue; Joshua J. Ward

[57] ABSTRACT

What is described herein is a process for making polymers of a vinyl lactam and a polymerizable carboxylic acid, optionally including a hydrophobic monomer, as a stable composition in an alcohol-water solvent system having a residual vinyl lactam content of less than 500 ppm.

9 Claims, No Drawings

PROCESS FOR MAKING POLYMERS OF VINYL LACTAM AND A POLYMERIZABLE CARBOXYLIC ACID, OPTIONALLY WITH, A HYDROPHOBIC MONOMER, AS A STABLE COMPOSITION IN AN ALCOHOL-WATER SOLVENT SYSTEM, HAVING A RESIDUAL VINYL LACTAM CONTENT OF LESS THAN 500 PPM

BACKGROUND OF THE INVENTION

1. Field of the Invention

This invention relates to a process for making polymers, and, more particularly, to a solution polymerization process for making polymers of a vinyl lactam, a polymerizable carboxylic acid, and, preferably, a hydrophobic monomer, which is provided as a stable composition in an alcohol-water solvent having a residual vinyl lactam content of less than 500 ppm.

2. Background of the Invention

Polymers of a vinyl lactam, preferably vinyl pyrrolidone, a polymerizable carboxylic acid, preferably acrylic acid or methacrylic acid, and, optionally, a hydrophobic monomer, preferably a long chain alkyl ($C_8$–$C_{24}$) acrylate, methacrylate, acrylamide or methacrylamide, have been prepared by solution polymerization in ethanol, or precipitation polymerization in heptane. However, such processes usually leave some residual vinyl lactam monomer. Since such terpolymers are used as hair spray fixatives it is desired to reduce the residual vinyl lactam content to commercially acceptable levels.

Accordingly, it is an object of this invention to provide a solution polymerization process for making polymers of a vinyl lactam, a polymerizable carboxylic acid and, optionally, a hydrophobic monomer, which are provided as a stable composition in an alcohol-water solvent having a residual vinyl lactam content of less than 500 ppm.

DESCRIPTION OF THE INVENTION

What is described herein is solution polymerization process for making polymers of a vinyl lactam, a polymerizable carboxylic acid and, preferably, a hydrophobic monomer which are provided as a stable composition in an alcohol-water solvent having a residual vinyl lactam content of less than 500 ppm.

Specifically, the invention is directed to a process of making a polymer of a vinyl lactam and a polymerizable carboxylic acid, optionally including a hydrophobic monomer, as a stable composition in an alcohol-water solvent, having a residual vinyl lactam content of less than 500 ppm, which comprises the steps of:

(a) solution polymerizing the monomer components of the polymer in a selected compositional range in alcohol solution at a predetermined temperature with a polymerization initiator to form a polymer reaction product, (b) adding water to the reaction product in a predetermined amount to form a polymer solution including an alcohol-water solvent having an alcohol-to-water weight ratio of 1:1 to 1:10, and (c) acid hydrolyzing the residual vinyl lactam monomer in said solution.

Another feature of the invention is a process wherein said vinyl lactam is vinyl pyrrolidone, said polymerizable carboxylic acid is acrylic acid or methacrylic acid, and said hydrophobic monomer is a $C_8$–$C_{24}$ alkyl acrylate, methacrylate, acrylamide or methacrylamide.

Still another feature is a process wherein said polymer is a vinyl pyrrolidone-acrylic acid copolymer.

Yet another aspect herein is a process wherein said polymer is a vinyl pyrrolidone-acrylic acid-lauryl methacrylate terpolymer.

Among the other features herein is a process wherein said alcohol is ethanol.

In the preferred form of the invention, the polymer is a hair fixative terpolymer containing 40–75% by weight of vinyl pyrrolidone, 15–40% of acrylic acid or methacrylic acid, and 5–25% of a long chain alkyl ($C_8$–$C_{24}$) acrylate, methacrylate, acrylamide or methacrylamide.

Another feature of the preferred process is wherein the residual vinyl pyrrolidone is acid hydrolyzed to 2-pyrrole in the presence of carboxylic acid groups on said polymer, and wherein the polymer contains 40–75% by weight vinyl pyrrolidone, 15–40% acrylic acid or methacrylic acid, and 5–25% of a $C_8$–$C_{24}$ alkyl acrylate, methacrylate, acrylamide or methacrylamide, preferably wherein the solids content of the polymer composition is 10–30%, and the pH of the polymer composition is 3–5.

The reaction product of the solution polymerization of the monomer components in alcohol is the desired polymer of at least a vinyl lactam and a polymerizable carboxylic acid, optionally including a hydrophobic monomer, in an alcohol solvent. However, some undesired amount of unreacted vinyl lactam monomer remains undisturbed in the alcohol solvent which is objectionable for commercial use of the polymer is such applications as personal care products.

In accordance with the invention herein, water is added to the alcoholic solution of the polymer and residual vinyl lactam to form an alcohol-water solvent system. Suitably the weight ratio of alcohol-to-water is adjusted to about 1:1 to 1:10, depending upon desired viscosity and solids content of the resultant polymer solution. In the presence of water, at a pH of about 3–5, the carboxylic acid groups on the polymer can provide free $H_3O^+$ cations to facilitate hydrolysis of residual vinyl lactam, at a predetermined temperature, rapidly to 2-pyrrole. If desired, some alcohol can be removed to increase the solids content of the solution.

The hydrolysis reaction temperature is about 50°–160° C., preferably 80°–130° C., and the reaction mixture can include a high temperature initiator, such as Lupersol 101.

EXAMPLE 1

A 2-liter, 4-neck resin kettle, fitted with an anchor agitator, a nitrogen purge adaptor, a thermometer, two subsurface feeding tubes connected with two feeding pumps, and a reflux condenser, was charged with 192 g. of vinyl pyrrolidone (VP) and 288 g. of ethanol. A nitrogen purge was started and continued throughout the reaction and the reactor content was agitated at about 200 rpm. After about 30 minutes at 65° C. the reactor was charged with 260 microliters of t-butyl peroxy pivalate initiator (Lupersol 11), and then 64 g. of acrylic acid in 96 g. of ethanol and 64 g. of lauryl methacrylate (LM) in 96 g. of ethanol were introduced simultaneously over a period of 3 hours. After one hour the reactor was heated to 78° C. and 100 microliters of Lupersol 11 was added. The reaction proceeded at 78° C. for 2 hours and then another 100 microliters of Lupersol 11 was added. This addition of Lupersol 11 was repeated twice more. Then 800 ml of water was added within 10 minutes and held at 85° C. for 4 hours. The reactor was allowed to cool to room temperature and the product was discharged. The residual VP content was 0.04% (400 ppm).

The procedure of Example 1 was followed to produce Examples 2–8 in Table 1.

TABLE 1

| Ex. No. | Precharge (g) VP | EtOH | Feed I (g) LM | EtOH | Feed II (g) AA | EtOH | Added Water (g) | % Solids | Residual VP (ppm) |
|---|---|---|---|---|---|---|---|---|---|
| 1 | 192 | 288 | 64 | 96 | 64 | 80 | 800 | 20 | 400 |
| 2 | 240 | 240 | 80 | 80 | 80 | 80 | 1200 | 20 | 300 |
| 3 | 216 | 264 | 72 | 88 | 72 | 88 | 1000 | 20 | |
| 4 | 144 | 336 | 48 | 112 | 48 | 112 | 640 | 20 | |
| 5 | 150 | 150 | — | — | 50 | 50 | 725 | 18 | |
| 6 | 150 | 225 | — | — | 50 | 75 | 665 | 17 | |
| 7 | 187.5 | 125 | — | — | 62.5 | 250 | 400 | 24.5 | |
| 8 | 150 | 150 | — | — | 150 | 150 | 900 | 20 | |
| 9 | 192 | 288 | 64 | 96 | 64 | 80 | 250 | | 300 |
| 10 | 192 | 288 | 64 | 96 | 64 | 80 | 250 | | 80 |

EXAMPLE 9

The procedure of Example 9 was followed to produce Example 10 in table 1.

A 2-liter, 4-neck resin kettle, fitted with an anchor agitator, a nitrogen purge adaptor, a thermometer, two subsurface feeding tubes connected with two feeding pumps, and a reflux condenser, was charged with 192 g. of vinyl pyrrolidone (VP) and 288 g. of ethanol. A nitrogen purge was started and continued throughout the reaction and the reactor content was agitated at about 200 rpm. After about 30 minutes at 65° C., the reactor was charged with 260 microliters of t-butyl peroxy pivalate initiator (Lupersol 11), and then 64 g. of acrylic acid in 96 g. of ethanol and 64 g. of lauryl methacrylate (LM) in 96 g. of ethanol were introduced simultaneously over a period of 3 hours. After one hour the reactor was heated to 78° C. and 100 microliters of Lupersol 11 was added. The reaction proceeded at 78° C. for 2 hours and then another 100 microliters of Lupersol 11 was added. This addition of Lupersol 11 was repeated twice more. Then 250 ml of water was added within 10 minutes and 250 ml of solvent was removed. Added 755 ml of water and held at 85° C. for 4 hours. The reactor was allowed to cool to room temperature and the product was discharged. The residual VP content was 0.04% (400 ppm).

While the invention has been described with particular reference to certain embodiments thereof, it will be understood that changes and modifications may be made which are within the skill of the art. Accordingly, it is intended to be bound only by the following claims, in which:

What is claimed is:

1. A process of making a polymer comprising a vinyl lactam and at least 15 weight percent of a polymerizable carboxylic acid, optionally including a hydrophobic monomer, containing carboxylic acid groups on the polymer as a stable composition in an alcohol-water solvent, having a residual vinyl lactam content of less than 500 ppm, which comprises:

(a) solution polymerizing the monomer components of the polymer in alcohol solution to form a polymer reaction product, (b) adding water to the reaction product in a predetermined amount to form a polymer solution including an alcohol-water solvent having an alcohol-to-water weight ratio of 1:1 to 1:10, and (c) acid hydrolyzing the residual vinyl lactam monomer in said polymer solution with the carboxylic acid groups on the polymer at about 50° to about 160° C. to reduce the residual vinyl lactam content to less than 500 ppm.

2. A process according to claim 1 wherein said vinyl lactam is vinyl pyrrolidone, said polymerizable carboxylic acid is acrylic acid or methacrylic acid, and said optional hydrophobic monomer is a $C_8$–$C_{24}$ alkyl acrylate, $C_8$–$C_{24}$ alkyl methacrylate, $C_8$–$C_{24}$ alkyl acrylamide or $C_8$–$C_{24}$ alkyl methacrylamide.

3. A process according to claim 1 wherein said polymer is a vinyl pyrrolidone-acrylic acid copolymer.

4. A process according to claim 1 wherein said alcohol is ethanol.

5. A process according to claim 2 wherein the residual vinyl pyrrolidone is acid hydrolyzed to 2-pyrrole in the presence of carboxylic acid groups on said polymer.

6. A process according to claim 1 wherein the hydrolysis reaction (c) is carried out at about 60 to about 150° C. for about 2–16 hours.

7. A process according to claim 6 wherein said hydrolysis is carried out at about 80 to about 130° C. for about 4–8 hours.

8. A process according to claim 1 wherein the solids content of the polymer composition is 10–30% by weight.

9. A process according to claim 8 wherein the pH of the polymer composition is 3–5.

* * * * *